US012724709B2

(12) United States Patent
Bartenev et al.

(10) Patent No.: US 12,724,709 B2
(45) Date of Patent: Sep. 1, 2026

(54) SYSTEMS AND METHODS FOR DYNAMIC CACHING OF RUNNING FRONTEND APPLICATIONS

(71) Applicant: Acronis International GmbH, Schaffhausen (CH)

(72) Inventors: German Bartenev, Singapore (SG); Xiaowen Tang, Singapore (SG); Serg Bell, Singapore (SG); Stanislav Protasov, Singapore (SG)

(73) Assignee: Acronis International GmbH, Schaffhausen (CH)

(*) Notice: Subject to any disclaimer, the term of this patent is extended or adjusted under 35 U.S.C. 154(b) by 59 days.

(21) Appl. No.: 19/014,698

(22) Filed: Jan. 9, 2025

(65) Prior Publication Data

US 2026/0195269 A1 Jul. 9, 2026

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC ............. G06F 12/0802; G06F 12/0811; G06F 2212/60; G06F 16/9574; G06F 3/0656; G06F 2212/1016; G06F 2212/1024; G06F 9/45533; G06F 16/957
USPC .................................................. 711/118, 122
See application file for complete search history.

(56) References Cited

U.S. PATENT DOCUMENTS

| | | | | |
|---|---|---|---|---|
| 9,311,328 B2 * | 4/2016 | Patil | .................... | G06F 16/1824 |
| 2021/0064675 A1 * | 3/2021 | Chugh | .................. | G06F 16/972 |
| 2021/0377117 A1 * | 12/2021 | Kanevsky | ............... | H04L 41/40 |

* cited by examiner

*Primary Examiner* — Hashem Farrokh
(74) *Attorney, Agent, or Firm* — ArentFox Schiff LLP; Michael Fainberg

(57) ABSTRACT

A system receives a user request to mount a child frontend application comprised in a primary frontend application. The system, in response to receiving the user request, checks whether the child frontend application is in a cache. The system, in response to determining that the child frontend application is not in the cache, mounts the child frontend application and initializes the child frontend application using a first lifecycle function that performs initial setup for the child frontend application. The system stores the child frontend application in the cache using a second lifecycle function for saving a current state of the child frontend application.

20 Claims, 7 Drawing Sheets

Computing Device 102

100

Frontend Application 104

Frontend Application Manager 106

Mounts/Unmounts/
Hides/Restores

Child Frontend
Application 108a

Mounts/Unmounts/
Hides/Restores

Child Frontend
Application 108b

Hides/Restores

Hides/Restores

Child Frontend
Application Cache 110

Cached Frontend
Application 112a

Cached Frontend
Application 112b

200

200

200

User 202

Parent Frontend App Manager 204

Child Frontend Apps Cache 206

Child Frontend App 208

Child Frontend App Manager 210 alt [cache parameter equals false]

Mount ()

onMount()

return childFrontendAppManagerID alt [path parameter provided]

Navigate(path)

Navigate(path)

return return

Return childFrontendAppManagerID

User 202

Parent Frontend App Manager 204

Child Frontend Apps Cache 206

Child Frontend App 208

Child Frontend App Manager 210

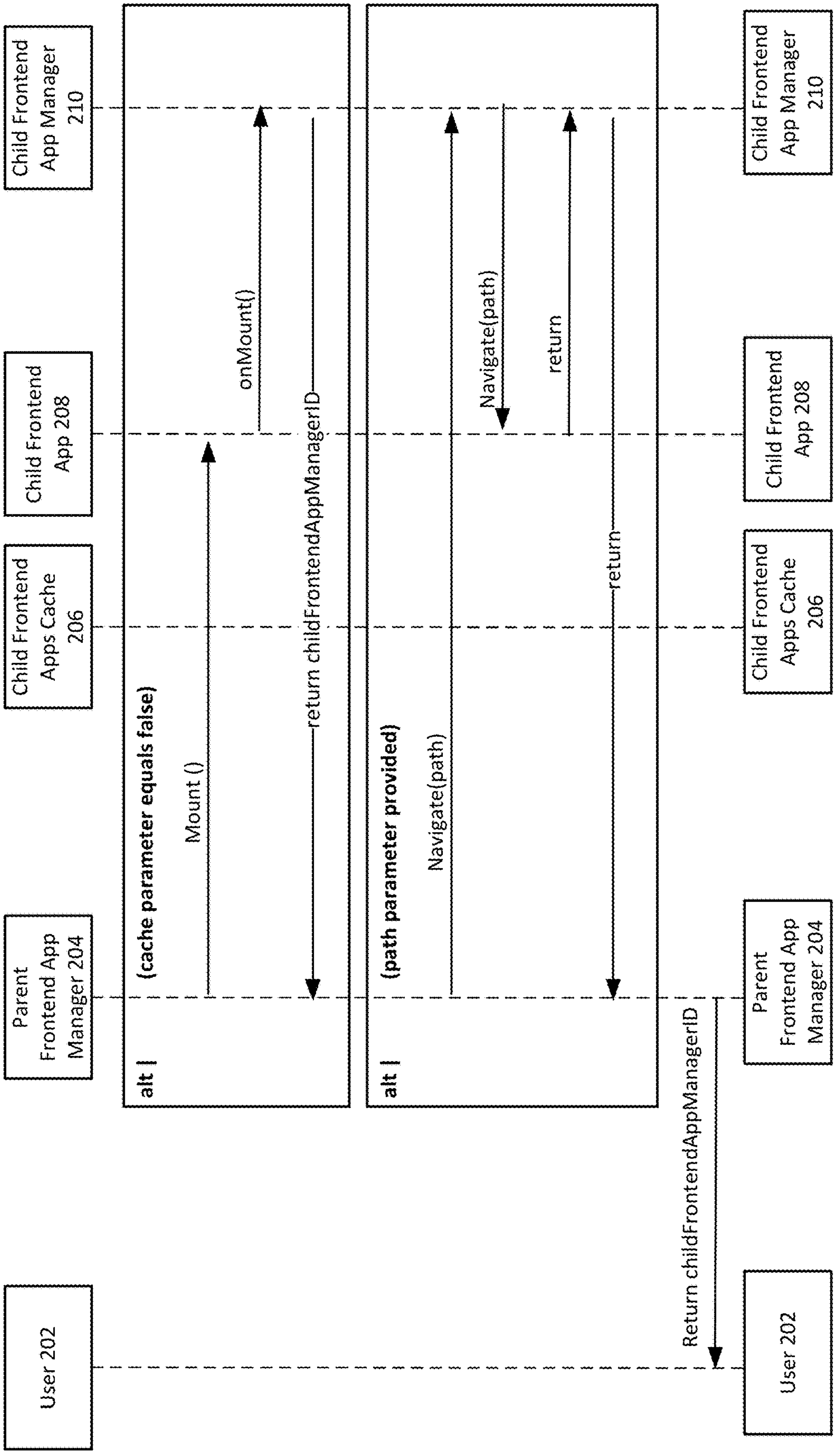

FIG. 2C

SYSTEMS AND METHODS FOR DYNAMIC CACHING OF RUNNING FRONTEND APPLICATIONS

FIELD OF TECHNOLOGY

The present disclosure relates to the field of software management, and, more specifically, to systems and methods for dynamic caching of running frontend applications.

BACKGROUND

Frontend applications in extensions are user interfaces integrated into web browsers, enhancing functionality by providing additional features directly within the browser environment. These applications typically use HTML, CSS, and JavaScript to create interactive and visually appealing experiences, allowing users to interact seamlessly with the extension's capabilities.

The growing flexibility and frequent user interactions involving navigation between extensions, where the content is a frontend application, have introduced new challenges in resource utilization and performance. As users navigate back and forth between extensions, the frontend applications within these extensions are repeatedly unmounted and mounted, causing repeated initialization and loading. This process leads to significant delays, increased resource consumption, extended wait times, and heightened computational overhead.

SUMMARY

The present disclosure describes an approach to address the issues mentioned previously by efficiently caching running frontend applications, thereby optimizing resource utilization and enhancing overall performance.

The systems and methods introduce a dynamic caching mechanism for running frontend applications within a single console or application. By implementing lifecycle events such as onHide( ) and onRestore( ), the system allows for seamless caching and retrieval of running frontend applications. This minimizes initialization times when navigating between different applications or pages that include different applications, thereby improving performance and resource utilization. The caching mechanism is configurable, enabling or disabling caching through a simple configuration file, which adds flexibility and ease of integration into existing systems. New frontend applications can be added to the system with or without cache support without any coding in the system itself. Additionally, this approach allows a frontend application to define multiple entry points and use different entry points of the same frontend application as content of different extensions. This allows for sharing a running frontend application between said extensions.

Aspects of the present disclosure describe dynamic caching of running frontend applications, which addresses the shortcomings of conventional systems described previously.

In one exemplary aspect, the techniques described herein relate to a method for dynamic caching of running frontend applications, the method including: receiving a user request to mount a child frontend application to a primary frontend application; in response to receiving the user request, checking whether the child frontend application is in a cache; in response to determining that the child frontend application is not in the cache: mounting the child frontend application; initializing the child frontend application using a first lifecycle function that performs initial setup for the child frontend application; and storing the child frontend application in the cache using a second lifecycle function for saving a current state of the child frontend application.

In some aspects, the techniques described herein relate to a method, further including: receiving a subsequent user request to mount the child frontend application to the primary frontend application after the child frontend application has been unmounted; in response to receiving the subsequent user request, checking whether the child frontend application is in the cache; in response to determining that the child frontend application is in the cache: returning the child frontend application from the cache; restoring the current state of the child frontend application using a third lifecycle function for reactivating the child frontend application to a previous state without full reinitialization.

In some aspects, the techniques described herein relate to a method, wherein reactivating the child frontend application to the previous state without full reinitialization includes not executing the first lifecycle function.

In some aspects, the techniques described herein relate to a method, further including: receiving another user request to unmount the child frontend application; and executing the second lifecycle function for saving a current state of the child frontend application in the cache.

In some aspects, the techniques described herein relate to a method, wherein the first lifecycle function further fetches initial data and sets up event listeners.

In some aspects, the techniques described herein relate to a method, wherein the second lifecycle function further manages resources of the child frontend application by releasing or pausing the resources that are not utilized when the child frontend application is hidden.

In some aspects, the techniques described herein relate to a method, wherein the third lifecycle function further reinitializes paused resources of the child frontend application.

In some aspects, the techniques described herein relate to a method, wherein the primary frontend application includes a plurality of child frontend applications including the child frontend application.

In some aspects, the techniques described herein relate to a method, wherein the child frontend application includes a plurality of children frontend applications.

In some aspects, the techniques described herein relate to a method, wherein the first lifecycle function and the second lifecycle function are executed by a manager of the child frontend application.

It should be noted that the methods described above may be implemented in a system comprising at least one hardware processor and memory. Alternatively, the methods may be implemented using computer executable instructions of a non-transitory computer readable medium.

In some aspects, the techniques described herein relate to a system for dynamic caching of running frontend applications, including: at least one memory; at least one hardware processor coupled with the at least one memory and configured, individually or in combination, to: receive a user request to mount a child frontend application to a primary frontend application; in response to receiving the user request, check whether the child frontend application is in a cache; in response to determining that the child frontend application is not in the cache: mount the child frontend application; initialize the child frontend application using a first lifecycle function that performs initial setup for the child frontend application; and store the child frontend application in the cache using a second lifecycle function for saving a current state of the child frontend application.

In some aspects, the techniques described herein relate to a non-transitory computer readable medium storing thereon computer executable instructions for dynamic caching of running frontend applications, including instructions for: receiving a user request to mount a child frontend application to a primary frontend application; in response to receiving the user request, checking whether the child frontend application is in a cache; in response to determining that the child frontend application is not in the cache: mounting the child frontend application; initializing the child frontend application using a first lifecycle function that performs initial setup for the child frontend application; and storing the child frontend application in the cache using a second lifecycle function for saving a current state of the child frontend application.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIGS. 2A-2C illustrate a mount sequence workflow.

DETAILED DESCRIPTION

Exemplary aspects are described herein in the context of a system, method, and computer program product for dynamic caching of running frontend applications. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

In the context of managed service providers (MSPs), user interfaces are often complex and dynamic, requiring frequent interactions with various frontend applications. Traditional approaches rely on static injection of frontend applications at the time of system compilation, with some means for optimizing these applications. The present disclosure introduces a solution that relies on dynamic frontend application injection during system runtime as extensions. This approach differs from traditional optimization methods that lack an effective caching mechanism—where the lack becomes a significant bottleneck. This invention addresses this gap by introducing a dynamic caching solution that leverages lifecycle events to optimize performance and enhance the user experience.

Figure 1:
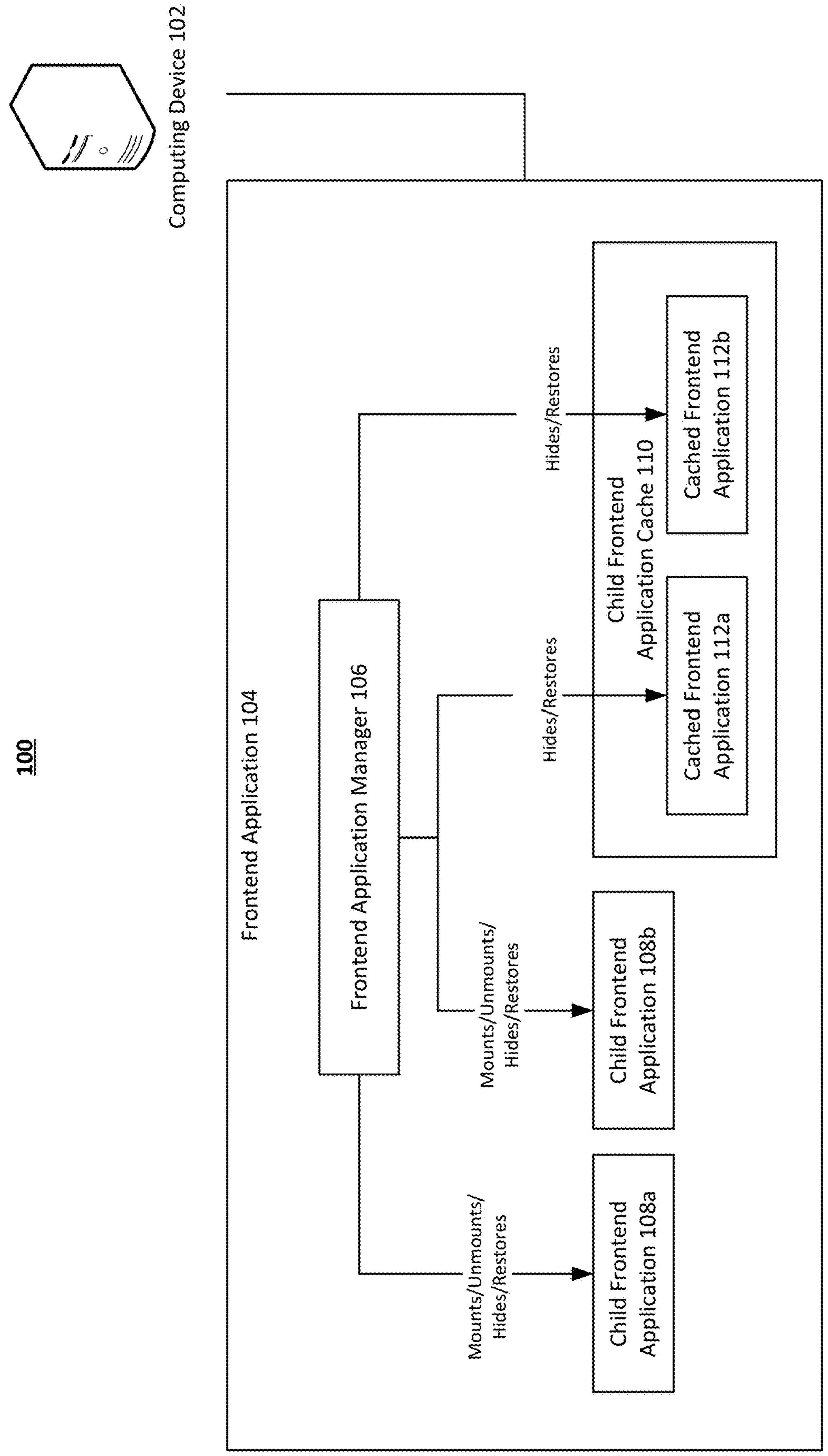
FIG. 1 is a block diagram illustrating a system for dynamic caching of running frontend applications.

FIG. 1 is a block diagram illustrating system 100 for dynamic caching of running frontend applications. System 100 is designed to manage the lifecycle of frontend applications through dynamic caching. System 100 includes frontend application 104, which is executed by computing device 102. In some aspects, computing device 102 may be a computer system 20 described in FIG. 5.

System 100 is designed to work efficiently on various client devices, including desktops, laptops, tablets, and mobile devices. Frontend application 104 includes frontend application manager 106, which manages the mounting, unmounting, hiding, and restoring of child frontend applications 108*a*, 108*b*, 112*a*, and 112*b*. In an exemplary aspect, system 100 includes child frontend application cache 110. In the example provided in FIG. 1, cache 110 includes cached frontend applications 112*a* and 112*b*. As will be described in reference to FIGS. 2A-3, lifecycle events include onHide( ) and onRestore( ) events, which facilitate caching and retrieval.

Consider a primary frontend application (hereinafter referred to as "Parent FA"), which is composed of smaller frontend applications (hereinafter referred to as "Child FAs"). These Child FAs are dynamically integrated into the Parent FA at runtime. For instance, the Parent FA may consist of a navigation menu and an empty HTML container designated for a display screen. When a user selects a specific item from the navigation menu, the corresponding Child FA is injected into the HTML container. In this context, the Child FAs represent the various navigation menu screens, which are developed and maintained independently from the Parent FA. Furthermore, certain navigation menu screens may themselves act as Parent FAs for additional Child FAs, such as tabbed interfaces. Therefore, the structure of FAs can be hierarchical, allowing for multiple levels of parent-child relationships. The methods disclosed in this disclosure pertain to the caching of executing frontend applications at a granular level. These methods have been implemented as a proprietary Node Package Manager (NPM) library. It is important to note that this caching mechanism is specifically concerned with the caching of executing FAs themselves, rather than the caching of data associated with these applications.

Consider an example of an e-commerce website. In this example, frontend application 104 is the main e-commerce website, which includes the homepage, product listings, shopping cart, and checkout process. Child frontend application 108*a* may be a product review widget embedded within the product detail page. This widget may, for example, allow users to read and submit reviews without leaving the main product page.

In an another example, consider an e-commerce platform. The homepage, product listings, shopping cart, checkout process, etc., may be child applications 108*a*, 108*b*, 108*c*, etc. New "pages" can be added at run-time. For example, a seller may want to add a custom page (e.g., a new child application) between a cart and a checkout, and the custom page may be shown only when a specific product of the seller is added to the cart.

In an another example, consider an social media platform. Frontend application 104 may be the main social media feed, which displays posts, stories, and advertisements. Accordingly, "post", "story" and "advertisement" may be the main system's extensions, each implemented as child applications. When a user navigates from "posts" to "stories", child application "posts" may be cached, and "stories" may be mounted.

The solution architecture of system 100 leverages a dynamic caching mechanism for frontend applications within a single console or application. This mechanism is designed to improve performance and resource utilization by minimizing initialization times when users navigate between different applications or pages. Cache 110 is a specialized cache for storing and retrieving child frontend applications. Cache 110 checks if a cached version of an application exists and returns it if available. Child frontend applications 108*a* and 108*b* represent the individual frontend applications that are mounted, initialized, hidden, and restored. A child frontend application manager manages the individual lifecycle events of a child frontend application, including initialization (onMount( )), restoration (onRestore( )), and hiding (onHide( )).

The onMount( ) function is called when a component or application is initially loaded or rendered. Its primary purpose is to perform any setup required for the component, such as fetching initial data, setting up event listeners, or initializing state. This function ensures that the component is properly rendered and ready for user interaction. Additionally, it executes any side effects that need to occur when the component is first added to the DOM (Document Object Model), making it a crucial part of the component's lifecycle.

The onRestore( ) function is invoked when a previously hidden or cached component is brought back into view or reactivated. Its main role is to restore the component's state to what it was before it was hidden or cached, ensuring a seamless user experience. This function reinitializes any necessary data or resources that may have been released or paused when the component was hidden. By avoiding full reinitialization and instead restoring the component to its previous state, onRestore( ) helps in optimizing performance.

The onHide( ) function is called when a component is about to be hidden or cached. It is responsible for saving the current state of the component so that it can be restored later when needed. This function also manages resources by releasing or pausing any resources or processes that are not needed while the component is hidden, such as stopping timers, unsubscribing from events, or pausing data fetching. By reducing the load on the system when the component is not in view, onHide( ) plays a key role in performance optimization.

Consider a single-page application (SPA) with multiple tabs. When a user navigates to a new tab for the first time, onMount( ) initializes the tab's content, fetches necessary data, and sets up event listeners. When the user switches to a different tab, onHide( ) saves the current state of the tab, stops any ongoing processes, and releases resources. When the user returns to the original tab, onRestore( ) restores the saved state, reinitializes necessary data, and resumes any paused processes, providing a seamless experience. These functions collectively help in managing the lifecycle of frontend applications, ensuring efficient resource utilization, and enhancing the user experience by maintaining state and optimizing performance.

In general, the term "FA extension" refers to an additional executing frontend application that may interact with an API, listen to events, respond to user inputs, and exchange data with the parent frontend application when it is mounted. All these activities must cease when the FA is cached. The system is designed to notify the FA that it is about to be suspended and awaits its response. The same procedure applies when restoring from cache. The parent application remains unaware of whether its child FA will be mounted, restored from cache, unmounted, or cached. This behavior is specified in the configuration of the independently injected FA, ensuring that the parent FA does not concern itself with caching operations. The entire process is encapsulated within the NPM library, which implements this concept.

Figure 2A:
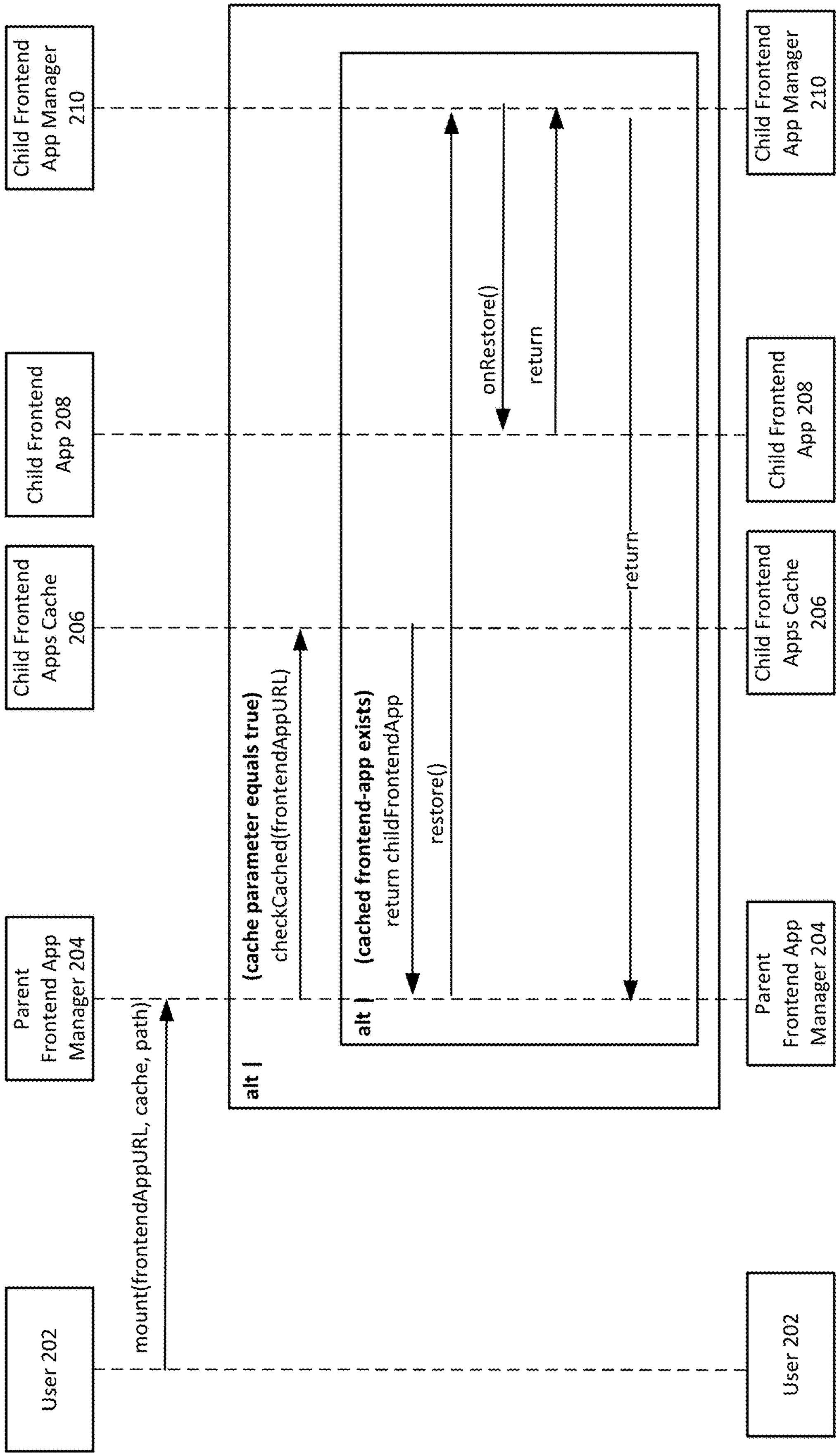
Figure 2B:
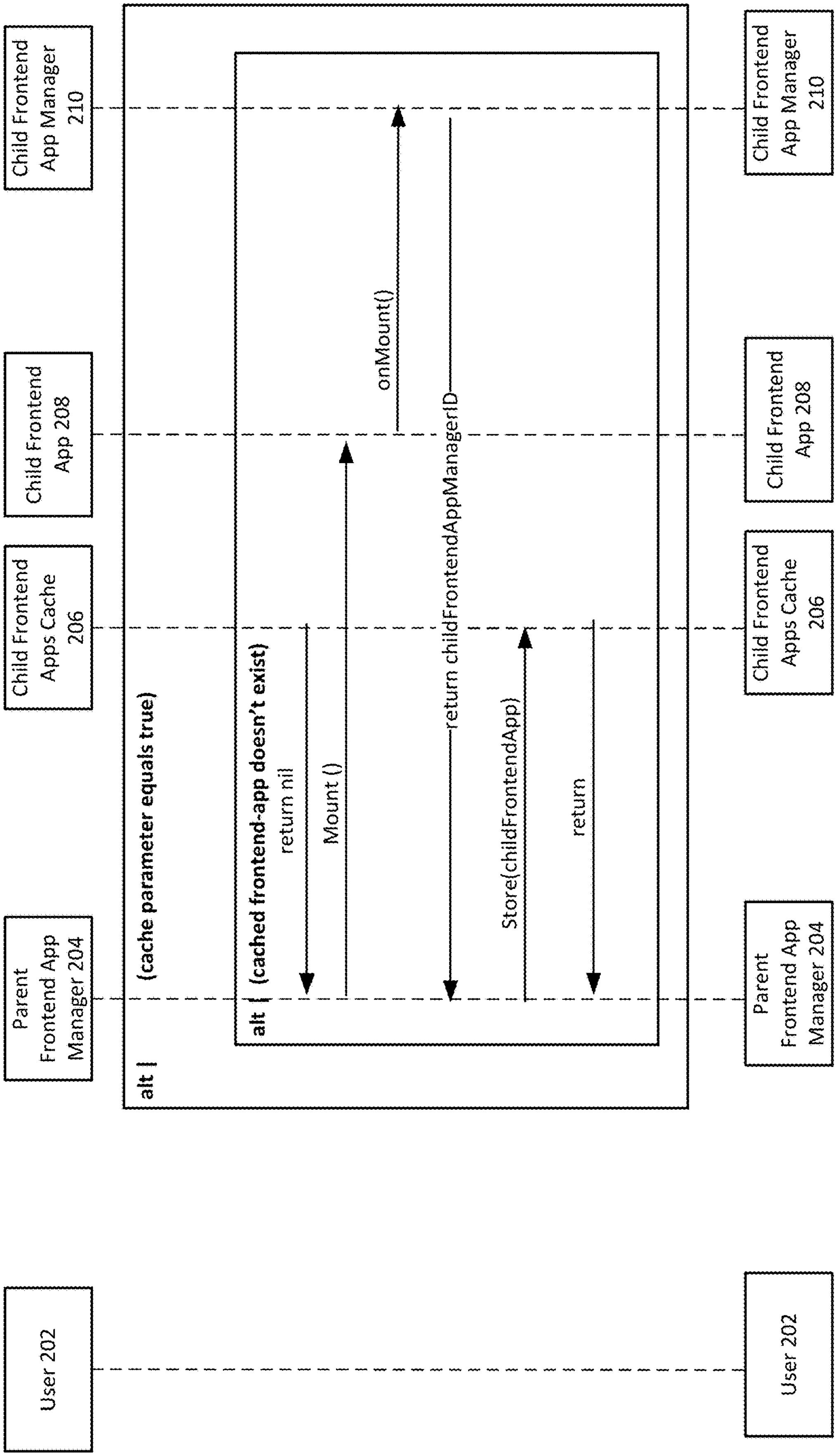

FIGS. 2A-2C illustrate a mount sequence workflow 200. FIG. 2A starts with initialization and mounting. When a user 202 navigates to a frontend application, manager 204 receives a request to mount the application at the location frontendAppUrl (mount(frontendAppUrl, cache, path)). Suppose that the frontendAppUrl is for child frontend application 208. If the cache parameter is set to true, manager 204 checks the cache 206 for a cached version of the application.

If a cached version exists, cache 206 returns the child frontend application 208 to manager 204, which then restores the application by invoking manager 210's onRestore( ) method. Child frontend application 208 is restored via its onRestore( ) method.

As shown in FIG. 2B, if no cached version exists, cache 206 returns "nil" and manager 204 mounts the child frontend application 208, initializes it through application 208's onMount( ) method, and stores the child frontend application 208 in cache 206.

As shown in FIG. 2C, in terms of direct mounting (i.e., no caching), if the cache parameter is false, manager 204 directly mounts the application 208 and initializes it without checking the cache 206.

If a path parameter is provided, manager 204 navigates the manager 210 to the specified path, and manager 210 navigates application 208 accordingly.

Figure 3:
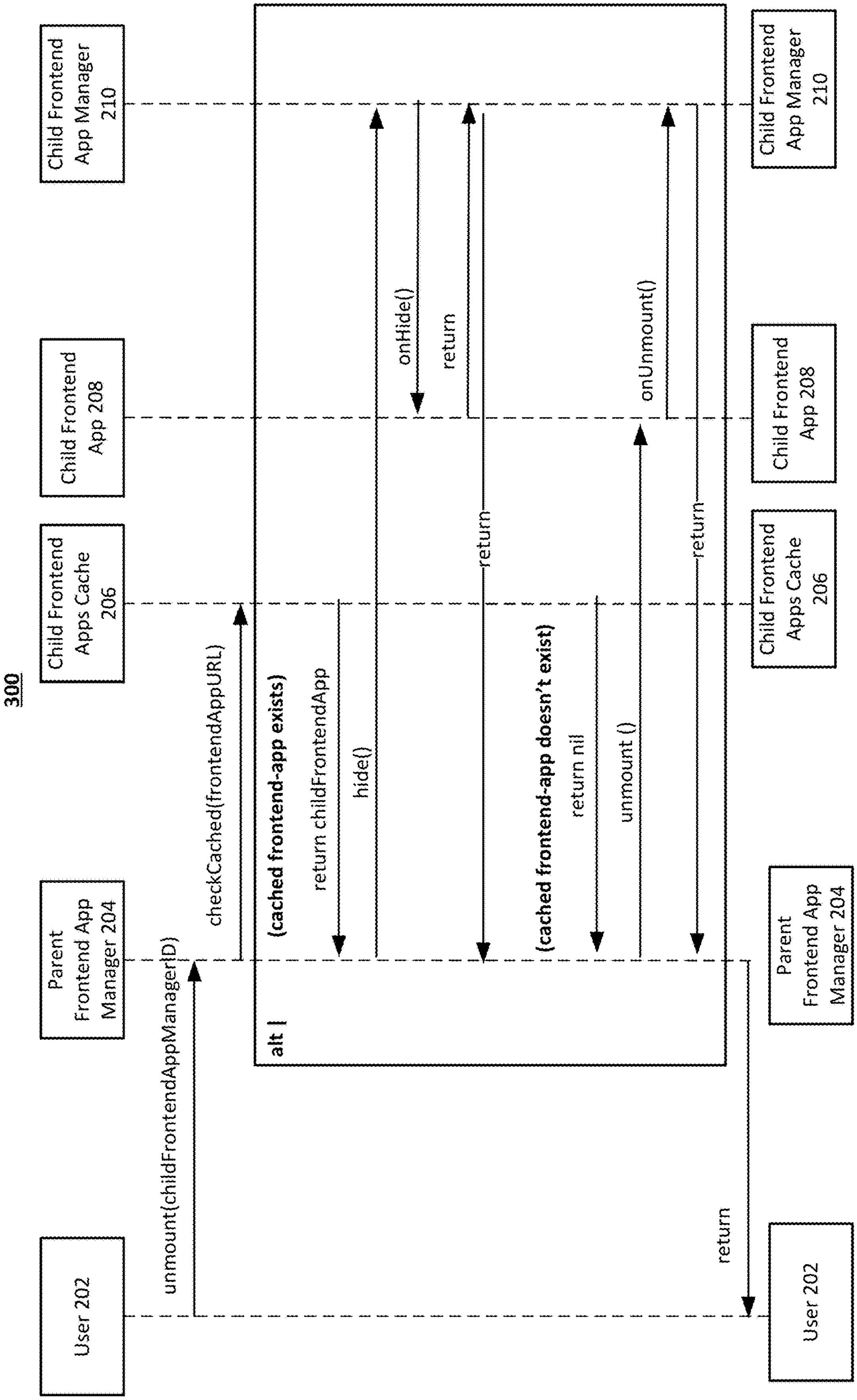
FIG. 3 illustrates an unmount sequence workflow.

FIG. 3 illustrates an unmount sequence workflow 300. In workflow 300, when a user initiates the unmounting process (using command unmount(childFrontEndAppManagerID), by navigating away from the application, the manager 204 checks cache 206. If the cached frontend application exists, the application is returned. Manager 204 then invokes manager 210's hide( ) method depending on the cache value provided during mounting, to cache the application's state via the onHide( ) lifecycle event, allowing the application to be restored later without reinitialization.

If the cached frontend application does not exist, cache 206 returns nil, manager 204 unmounts child frontend application 208, which executes onUnmount( ) using manager 210.

Benefits of the systems and methods of the present disclosure include, improved performance by reducing the need to reinitialize applications. System 100 significantly improves load times and user experience. System 100 further provides flexibility and scalability such that the configurable caching mechanism allows for easy integration into existing systems and can scale to accommodate complex UI structures. System 100 further reuses logic such that it allows large frontend applications with multiple entry points to function as different extensions.

This architecture provides a robust solution for dynamically managing and caching frontend applications, addressing the performance and resource utilization challenges typically associated with large, interactive web applications.

The proposed dynamic caching mechanism for frontend applications offers several novel features and improvements over existing technologies. Firstly, it includes a configurable caching mechanism that leverages dynamic lifecycle events such as onHide( ) and onRestore( ) to enable seamless caching and retrieval of frontend applications. This minimizes reinitialization and improves load times. The mechanism can be easily enabled or disabled via a configuration file, providing flexibility and ease of integration without significant code changes.

Secondly, the mechanism ensures efficient resource utilization through on-demand caching, where applications are cached only when needed, thereby reducing memory usage and improving system performance. It also employs selective caching for frequently accessed applications, optimizing resource use.

Thirdly, the dynamic caching mechanism enhances the user experience by significantly reducing initialization times when navigating between applications, thanks to the restoration of applications from the cache. Lifecycle events ensure consistent state management, maintaining application states across sessions.

Additionally, the mechanism is designed for scalability and flexibility. Its framework-agnostic design makes it compatible with any frontend framework, ensuring adaptability and ease of integration. The weakly coupled architecture, with compile-time dependencies on interfaces only, ensures a scalable and maintainable codebase.

In terms of maintainability, the mechanism simplifies integration by allowing existing applications to be retrofitted with minimal changes through the implementation of lifecycle events and updates to the configuration file. This abstraction of caching logic into a reusable component reduces the need for custom caching solutions, thereby reducing development overhead.

When compared to existing solutions, the dynamic caching mechanism offers a more efficient and flexible approach than traditional static caching strategies. It also enhances the micro-frontends approach by introducing dynamic caching and state management capabilities, effectively addressing caching and state management challenges.

System 100 may be beneficial for working frontend products for MSPs (e.g., admin and product control panels with dynamic and static components where efficient loading of necessary libraries and components is on demand) or a single console, which is a centralized hub unifying all hosted frontend applications for efficient management of library dependencies.

In some aspects, system 100 may further include features such as:

- Advanced Predictive Caching: Using machine learning to predict and cache applications based on user behavior.
- Cross-Platform Caching: Extending the caching mechanism to support multiple platforms and devices seamlessly.
- Enhanced Security: Implementing robust security measures to ensure cached data integrity and confidentiality.

Figure 4:
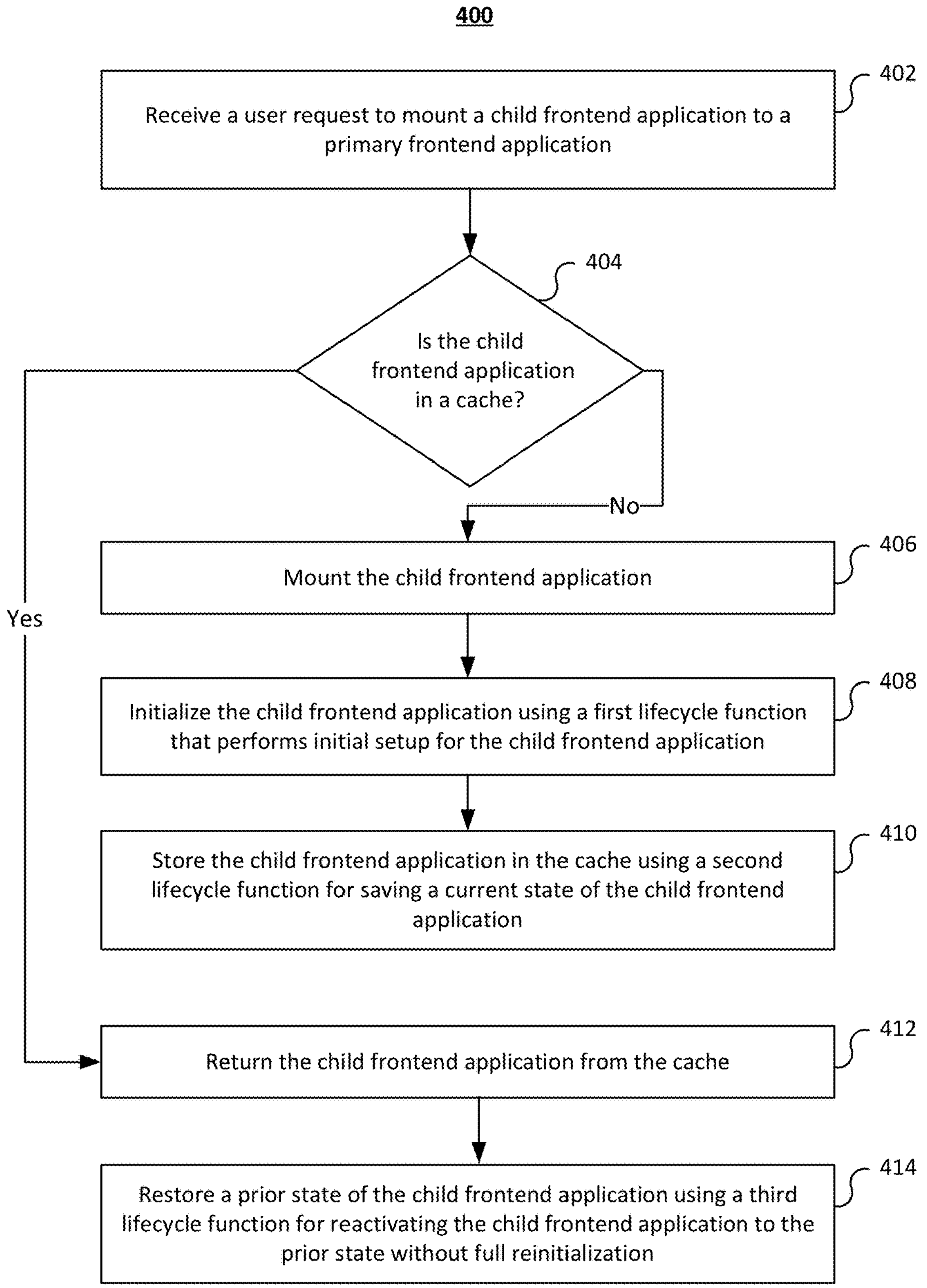
FIG. 4 illustrates a flow diagram of a method for dynamic caching of running frontend applications.

FIG. 4 illustrates a flow diagram of method 400 for dynamic caching of running frontend applications. At 402, manager 106 receives a user request to mount a child frontend application (e.g., child frontend application 108*a* or cached frontend application 112*a*) to a primary frontend application (e.g., frontend application 104). At 404, manager 106 checks whether the child frontend application is in a cache (e.g., cache 110).

In response to determining that the child frontend application is not in the cache, method 400 advances to 406, where manager 106 mounts the child frontend application. At 408, manager 210 initializes the child frontend application using a first lifecycle function that performs initial setup for the child frontend application. In some aspects, the first lifecycle function further fetches initial data and sets up event listeners. At 410, manager 210 stores the child frontend application in the cache using a second lifecycle function for saving a current state of the child frontend application.

If at 404, manager 106 determines that the child frontend application is in the cache (whether for the same user request or for a subsequent user request), method 400 advances to 412. At 412, manager 210 returns the child frontend application from the cache. At 414, manager 210 restores the current state of the child frontend application using a third lifecycle function for reactivating the child frontend application to a previous state without full reinitialization. In some aspects, manager 210 reactivates the child frontend application to the previous state without full reinitialization comprises not executing the first lifecycle function. In some aspects, the third lifecycle function further reinitializes paused resources of the child frontend application.

In some aspects, manager 106 may receive another user request to unmount the child frontend application. Accordingly, manager 210 may execute the second lifecycle function for saving a current state of the child frontend application in the cache. In some aspects, the second lifecycle function further manages resources of the child frontend application by releasing or pausing the resources that are not utilized when the child frontend application is hidden.

In some aspects, the primary frontend application comprises a plurality of child frontend applications including the child frontend application.

In some aspects, the child frontend application includes a plurality of children frontend applications.

Figure 5:
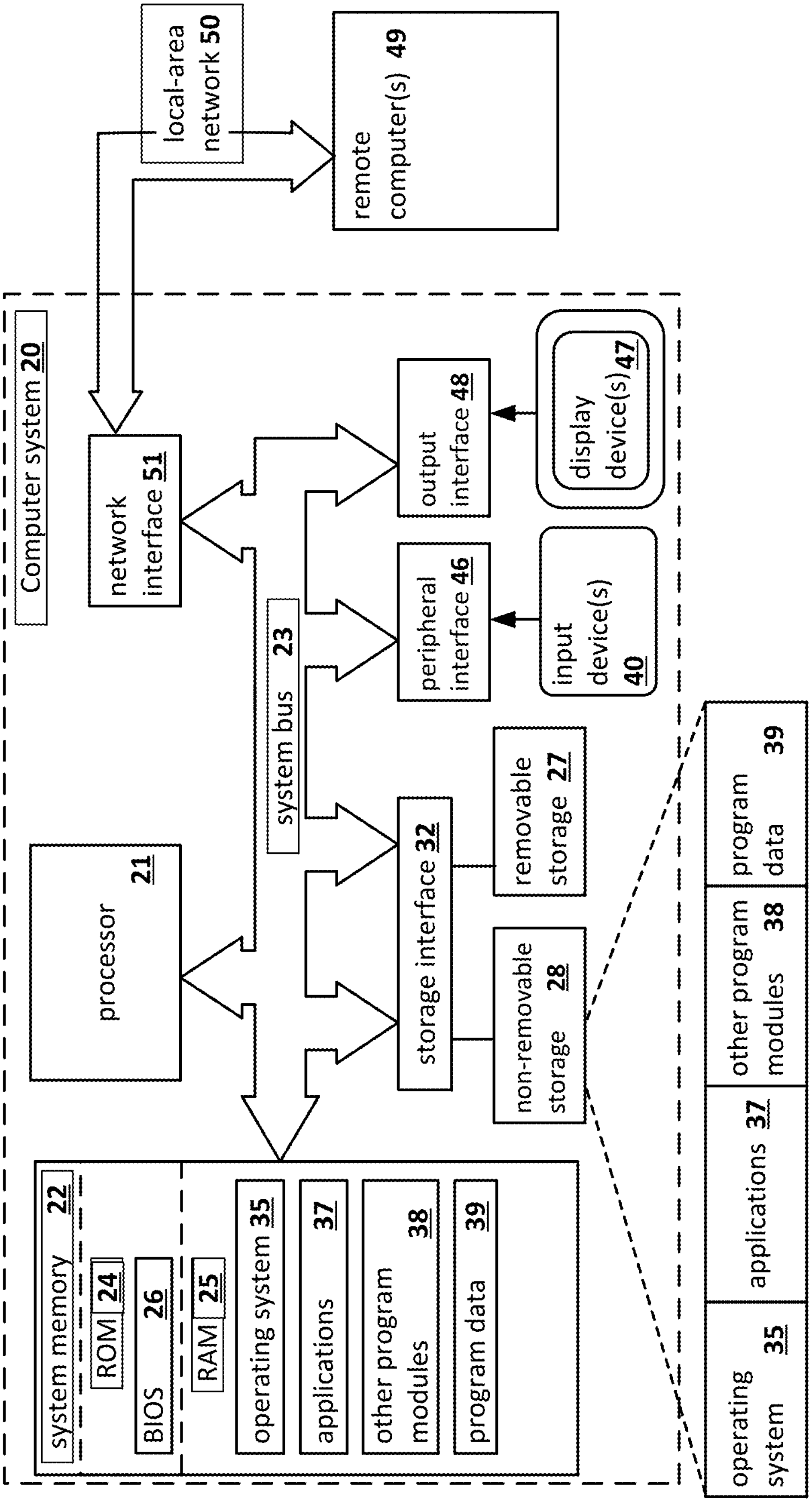
FIG. 5 presents an example of a general-purpose computer system on which aspects of the present disclosure can be implemented.

FIG. 5 is a block diagram illustrating a computer system 20 on which aspects of systems and methods for dynamic caching of running frontend applications may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for dynamic caching of running frontend applications, the method comprising:
- receiving a user request to mount a child frontend application comprised in a primary frontend application;
- in response to receiving the user request to mount a child frontend application, checking whether the child frontend application is in a cache;

in response to determining that the child frontend application is not in the cache:
- mounting the child frontend application;
- initializing the child frontend application using a first lifecycle function that performs initial setup for the child frontend application; and
- storing the child frontend application in the cache using a second lifecycle function for saving a current state of the child frontend application.

2. The method of claim 1, further comprising:
- receiving a subsequent user request to mount the child frontend application comprised in the primary frontend application after the child frontend application has been unmounted;
- in response to receiving the subsequent user request, checking whether the child frontend application is in the cache;
- in response to determining that the child frontend application is in the cache:
  - returning the child frontend application from the cache;
  - restoring the current state of the child frontend application using a third lifecycle function for reactivating the child frontend application to a previous state without full reinitialization.

3. The method of claim 2, wherein reactivating the child frontend application to the previous state without full reinitialization comprises not executing the first lifecycle function.

4. The method of claim 2, wherein the third lifecycle function further reinitializes paused resources of the child frontend application.

5. The method of claim 1, further comprising:
- receiving another user request to unmount the child frontend application; and
- executing the second lifecycle function for saving the current state of the child frontend application in the cache.

6. The method of claim 5, wherein the second lifecycle function further manages resources of the child frontend application by releasing or pausing the resources that are not utilized when the child frontend application is hidden.

7. The method of claim 1, wherein the first lifecycle function further fetches initial data and sets up event listeners.

8. The method of claim 1, wherein the primary frontend application comprises a plurality of child frontend applications including the child frontend application.

9. The method of claim 1, wherein the child frontend application includes a plurality of children frontend applications.

10. The method of claim 1, wherein the first lifecycle function and the second lifecycle function are executed by a manager of the child frontend application.

11. A system for dynamic caching of running frontend applications, comprising:
- at least one memory;
- at least one hardware processor coupled with the at least one memory and configured, individually or in combination, to:
- receive a user request to mount a child frontend application comprised in a primary frontend application;
- in response to receiving the user request to mount a child frontend application, check whether the child frontend application is in a cache;
- in response to determining that the child frontend application is not in the cache:
  - mount the child frontend application;
  - initialize the child frontend application using a first lifecycle function that performs initial setup for the child frontend application; and
- store the child frontend application in the cache using a second lifecycle function for saving a current state of the child frontend application.

12. The system of claim 11, wherein the at least one hardware processor is further configured to:
- receive a subsequent user request to mount the child frontend application comprised in the primary frontend application after the child frontend application has been unmounted;
- in response to receiving the subsequent user request, check whether the child frontend application is in the cache;
- in response to determining that the child frontend application is in the cache:
  - return the child frontend application from the cache;
  - restore the current state of the child frontend application using a third lifecycle function for reactivating the child frontend application to a previous state without full reinitialization.

13. The system of claim 12, wherein the at least one hardware processor is further configured to reactivate the child frontend application to the previous state without full reinitialization by not executing the first lifecycle function.

14. The system of claim 12, wherein the third lifecycle function further reinitializes paused resources of the child frontend application.

15. The system of claim 11, wherein the at least one hardware processor is further configured to:

receive another user request to unmount the child frontend application; and execute the second lifecycle function for saving a current state of the child frontend application in the cache.

16. The system of claim 15, wherein the second lifecycle function further manages resources of the child frontend application by releasing or pausing the resources that are not utilized when the child frontend application is hidden.

17. The system of claim 11, wherein the first lifecycle function further fetches initial data and sets up event listeners.

18. The system of claim 11, wherein the primary frontend application comprises a plurality of child frontend applications including the child frontend application.

19. The system of claim 11, wherein the child frontend application includes a plurality of children frontend applications.

20. A non-transitory computer readable medium storing thereon computer executable instructions for dynamic caching of running frontend applications, including instructions for:

receiving a user request to mount a child frontend application comprised in a primary frontend application;

in response to receiving the user request to mount a child frontend application, checking whether the child frontend application is in a cache:

in response to determining that the child frontend application is not in the cache:

mounting the child frontend application;

initializing the child frontend application using a first lifecycle function that performs initial setup for the child frontend application; and storing the child frontend application in the cache using a second lifecycle function for saving a current state of the child frontend application.

* * * * *